United States Patent [19]

Pugh et al.

[11] Patent Number: 5,022,713

[45] Date of Patent: Jun. 11, 1991

[54] VENTING MASTER CYLINDER RESERVOIR DIAPHRAGM

[75] Inventors: Cecil C. Pugh, Kettering; John R. Coleman, Dayton, both of Ohio

[73] Assignee: General Motors Corporation, Detroit, Mich.

[21] Appl. No.: 348,929

[22] Filed: May 8, 1989

[51] Int. Cl.[5] .................................................. F17B 7/10
[52] U.S. Cl. ........................................ 303/1; 60/592; 137/493.9; 220/209
[58] Field of Search .................. 303/1, 85; 150/534, 150/535, 493, 592; 137/859, 854, 493.8, 493.9, 572, 512.4; 220/208, 209

[56] References Cited

U.S. PATENT DOCUMENTS

| | | | |
|---|---|---|---|
| 3,023,924 | 3/1962 | Boyer | 220/39 |
| 3,070,058 | 12/1962 | Boyer | 113/121 |
| 3,077,283 | 7/1960 | Shutt et al. | 220/44 |
| 3,296,396 | 5/1965 | Stiward | 200/84 |
| 3,423,939 | 1/1969 | Lewis et al. | 60/592 X |
| 3,430,648 | 3/1969 | Botkin | 137/493.9 |
| 3,439,873 | 4/1969 | Relf | 137/493.9 |
| 4,130,222 | 12/1978 | Ono | 220/373 |
| 4,136,712 | 1/1979 | Nogami et al. | 137/558 |
| 4,181,147 | 1/1980 | Fujii et al. | 137/572 |
| 4,192,345 | 3/1980 | Fujii et al. | 137/572 |
| 4,198,824 | 4/1980 | Nogami et al. | 60/535 |
| 4,232,518 | 11/1980 | Suzuki et al. | 60/535 |
| 4,307,815 | 12/1981 | Sakazume | 220/85 |
| 4,445,333 | 5/1984 | Coleman | 60/578 |
| 4,445,334 | 5/1984 | Derrick | 60/585 |
| 4,455,827 | 6/1984 | Margetts | 60/547 |
| 4,602,482 | 7/1986 | Kubota et al. | 60/592 |
| 4,922,954 | 5/1990 | Blomquist et al. | 220/209 X |

Primary Examiner—Matthew C. Graham
Attorney, Agent, or Firm—Ernest E. Helms

[57] ABSTRACT

A reservoir diaphragm for a vehicle brake master cylinder fluid reservoir has a passage in communication with the atmosphere defined between the reservoir cover and diaphragm. The diaphragm has a slot receiving a projection from the cover to normally form a seal. The seal prevents pasage of air between the reservoir and the passageway when the reservoir substantially equals the atmospheric pressure. The diaphragm is movable with respect to the projection to open the seal when the pressure in the reservoir is less than the atmosphere thereby allowing air from the atmosphere to enter the reservoir.

3 Claims, 1 Drawing Sheet

VENTING MASTER CYLINDER RESERVOIR DIAPHRAGM

FIELD OF THE INVENTION

The field of the present invention is that of vehicle master cylinders with vented brake fluid reservoirs, apparatuses and methods of utilization thereof.

DISCLOSURE STATEMENT

Master cylinder reservoirs come in two major types. One type is the nonvented, and the other being the vented master cylinder reservoirs. In the nonvented master cylinder reservoir the reservoir is covered by a flexible diaphragm which provides a variable control volume to accommodate changes in the fluid level within the reservoir. Typically, the unvented reservoir has a diaphragm held in place by a large cap with a spring clamp. In an attempt to make the brake fluid reservoir more user friendly in maintenance, the reservoir was developed with a screw cap to make servicing the reservoir more convenient. However, the diaphragm within the screw cap did not in itself have enough displacement to accommodate the fluid changes with the reservoir. Therefore, the diaphragm and cap are vented. Care must be taken in vented reservoirs to provide a venting system which allows the reservoir to be vented while at the same time excluding the entrance of particles into the brake fluid. Previously such diaphragms had a slit, such as disclosed in Boyer, U.S. Pat. No. 3,070,058. However, it is important that the slit open whenever there is an excessive pressure or a vacuum within the brake fluid reservoir. Entrapment of lubricant upon the diaphragm can sometimes cause the diaphragm to inadvertently seal shut. Some leakage or loss of fluid always does occur sooner or later and, if the vent is kept closed, a vacuum will build up in the reservoir. This means, then, that an inadequate supply of brake fluid is soon provided in front of the master cylinder and that on pumping the brake pedal very little additional fluid is provided, causing the brakes to be soft and spongy. Sensor systems, that indicate when there is a leak in the system, require the system to vent properly to indicate that there is a leak. A non-vented system would not drain properly to give the desired response with sensor systems.

SUMMARY OF THE INVENTION

The present invention provides a venting method that assures the venting of the master cylinder, when there is a vacuum in the cylinder. The vent opening means are configured in such a manner that ensures that upon a vacuum the seal will be open and allow barometric pressure to return to a predetermined pressure.

It is the object of the present invention to provide a master cylinder reservoir diaphragm with assured venting apparatus and method of utilization thereof.

It is an object of the present invention to provide an improved means which allows air into the reservoir chamber, whereby to provide a prompt indication of fluid transfer from said reservoir chamber so that corrective action may be initiated.

It is an object of the present invention to provide a means which does not allow fluid losses through a diaphragm under all conditions.

It is an object of the present invention to provide a means which allows fluid to bleed until sensors report losses.

A still further object of this invention is to provide an improved master cylinder reservoir diaphragm cover to solve a fluid seep or transfer problem.

It is a more specific object of the present invention to provide a reservoir diaphragm cover assembly for a vehicle brake master cylinder fluid reservoir having a chamber between the reservoir cover and the diaphragm; and wherein the reservoir cover cooperates with the sealing edge of the reservoir diaphragm to vent the chamber and has a projection that interacts with a receptacle portion of the diaphragm which projects towards and parallel to the cover projection to form a seal; and wherein the diaphragm has a hole which is located adjacent to the interior wall of the receptacle; and wherein the reservoir diaphragm has a fluid access means projecting into the fluid reservoir away from the cover and interfacing with the hole; thereby to allow the reservoir to vent while minimizing the amount of fluid splash that may reach the seal, whereby to provide a seal which is normally closed to prevent passage between the fluid reservoir and chamber, and a seal which is open at a predetermined limit to permit air to enter the reservoir from the chamber.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
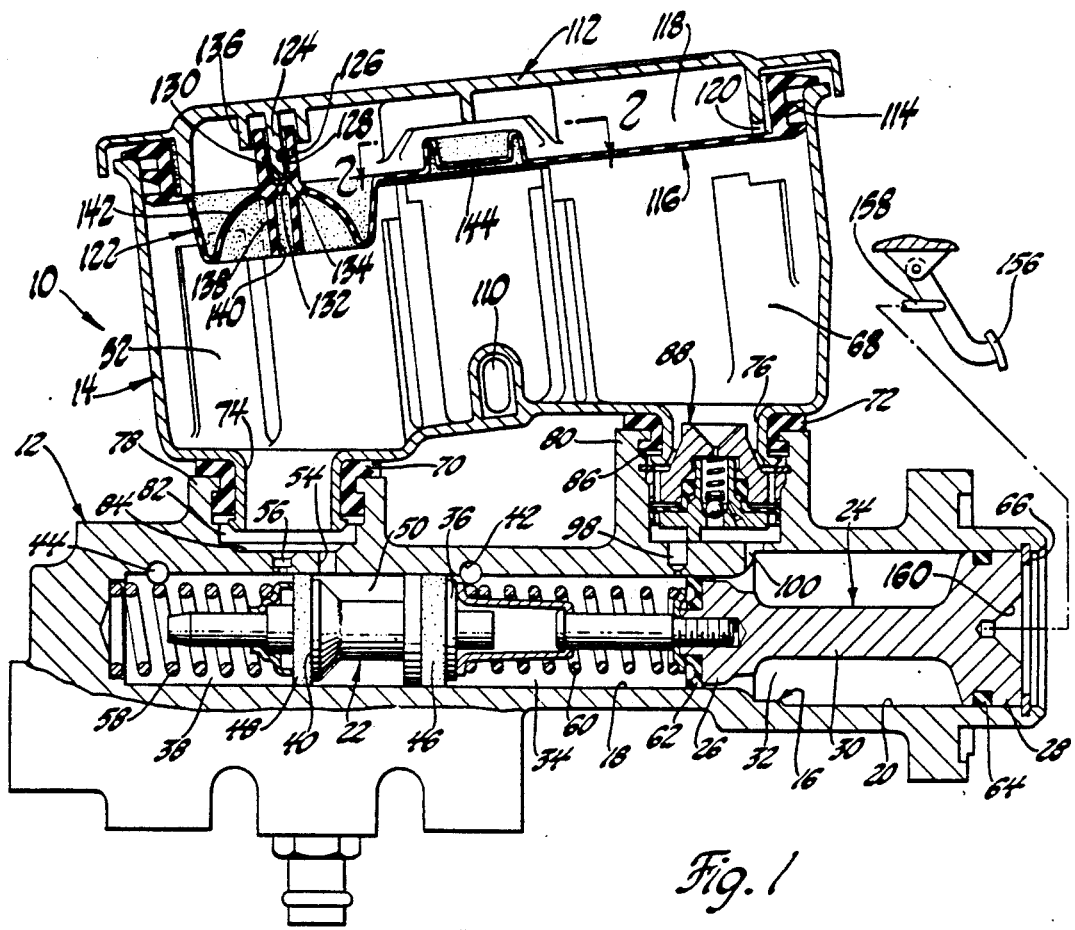
FIG. 1 is a sectional view of a master cylinder with reservoir and cover.

The master cylinder assembly 10 includes a housing 12 and a reservoir body 14. The housing has a stepped bore 16 formed therein with a smaller diameter forward section 18 in a larger diameter rear section 20. Since the master cylinder is shown as being of the dual circuit type, it is provided with two pressurizing pistons. The forward piston 22 is the secondary piston and is reciprocally received in the forward portion of forward section 18. The rear piston 24 is the primary piston and is a stepped piston. It has a forward piston head 26 formed as a piston land and reciprocably received in the rear portion of bore section 18. It has a rear piston head 28 formed as a land and reciprocably received in bore section 20. The piston heads 26 and 28 are joined by a reduced diameter section 30.

Piston 24 cooperates with bore 16 to define a high volume or quick take-up chamber 32 between piston or heads 26 and 28. A high pressure pressurizing chamber 34 is defined by the rear part of the bore section 18, piston head 26, and the rear end 36 of the secondary piston 22. Another high pressure pressurizing chamber 38 is defined by the forward end 40 of secondary piston 22 and the forward end of bore section 18. An outlet 42 is provided in housing 12 to deliver brake fluid pressurizing in chamber 34 to one brake circuit, and an outlet 44 is provided in housing 12 to deliver brake fluid from pressurizing chamber 38 to another brake circuit. Piston 22 has cup seals 46 and 48 respectively mounted on piston ends 36 and 40 in the usual manner. Cup seal 46 will prevent flow from chamber 34 past secondary piston end 36. Cup seal 48 will prevent fluid flow from pressurizing chamber 38 past piston end 40. The chamber 50 between piston ends 36 and 40 is a compensation chamber which is continually connected to brake fluid reservoir chamber 52 through compensation port 54. The compensation port 56 provides communication between pressurizing chamber 38 in reservoir chamber 52 when the secondary piston is in the fully released position shown in FIG. 1, so that cup seal 48 uncovers port 56. A piston return spring 58 is provided in chamber 38 and continually urges secondary piston 22 towards a released position. A piston return spring 60 in chamber 34 continually urges piston 24 towards a released position. Spring 60 is a cage spring as is well known in the art, which when extended to its permissible limit also establishes the release position of secondary piston 22.

A cup seal 62 is mounted on the port side of piston head 26 of primary piston 24. Seal 62 is arranged to prevent fluid flow from pressurizing chamber 34 to quick take-up chamber 32, while acting as a check valve which permits fluid flow from chamber 32 to chamber 34 around the outer periphery of piston head 26 in the lip of cup seal 62 while pressure in chamber 32 is greater than pressure in chamber 34. A seal 64 is mounted on piston head 28 to seal the rear end of chamber 32. Piston stop 66 is provided in the open end of enlarged port section 20 and forms an abutment engaged by piston head 28 when the master cylinder is in the fully released position.

The reservoir body 14 in addition to fluid chamber 52 for the forward pressurizing chamber 38, has a fluid chamber 68 for the pressurizing chambers 32 and 34. The reservoir body is secured to the master cylinder housing by use of annular retaining and sealing means 70 and 72 which cooperate with short mounting tubes 74 and 76 formed as a part of reservoir body 14. The retaining and sealing means 70 and 72 and the mounting tubes 74 and 76 are respectively received in annular bosses 78 and 80 formed as part of housing 12. Boss 78 has a recess 82 opening upwardly to receive retaining and sealing means 70 and mounting tube 74 in open communication with chamber 52. Conversation port 54 and 56 open through the bottom surface 84 of recess 82 as well as the side wall of forward section 18.

Boss 80 has a recess 86 which similarly receives retaining and sealing means 72 and mounting tube 76. The lower portion of recess 86 is also a valve unit chamber receiving the compensation control and blow-off valve unit 88. This portion of the master cylinder assembly is explained in more detail in the commonly assigned U.S. Pat. No. 4,208,881 to Brademeyer et al. A greater understanding of this part is not required to comprehend this current invention.

The reservoir body 14 has a sensing device 110, that indicates when there is a loss of fluid in the system. The fluid level sensing device 110 is connected electrically to an indicator (not shown). The reservoir diaphragm 116 has a sealing edge 114 which is used for connecting the reservoir cover 112 and diaphragm 116 to the reservoir body 14. The reservoir cover 112 and reservoir diaphragm 116 in combination form a chamber 118. The chamber 118 vents to atmosphere through path 120.

The reservoir diaphragm 116 includes a splash containment and seal portion 122. The reservoir cover 112 has a projection 124 that is received in the receptacle means 126 formed on and projecting from the diaphragm 116. The receptacle means 126 is part of the splash containment and seal portion 122. Receptacle means 126 and internal wall 128 form a sealing surface 130 which is contiguous to a hole 132 through the diaphragm 116. The receptacle means sealing surface 130 is normally in contact with the sealing surface 134 of projection 124. This embodiment has an alignment projection 136 protruding from the reservoir cover 112 to reduce the amount of splashing of brake fluid out of the receptacle means 126 into the chamber 118.

The reservoir diaphragm 116 has projecting from it towards the fluid chambers 52 and 68 a fluid access means 138. The interior 140 of the fluid access means 138 is proximal to the hole 132 through the reservoir diaphragm 116. The fluid access means 138 prevents the majority of fluid that is splashing in the fluid chamber 52 from reaching the hole 132. Fluid access means 138 allows air to enter the fluid chambers 52 and 68 when a vacuum has developed. The atmosphere is connected to the fluid access means 138, by way of path 120 into the chamber 118, then through the containment and seal portion 122.

The reservoir diaphragm 116 is molded into a dome 142 which facilitates the movement of receptacle means 126 and the fluid access means 138 on the occurrence of a vacuum in the fluid chambers 52 and 68.

Figure 2:
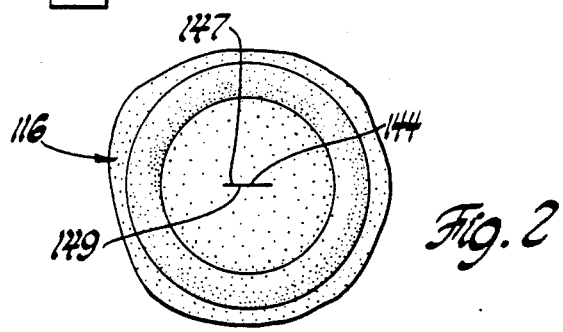
FIG. 2 is a fragmentary view taken along 2—2 in FIG. 1 and to show a diaphragm having slot similar to the prior art.

The reservoir diaphragm 116 has a slot 144 with a pair of edges 147 and 149 located at a different location than the dome 142. When the fluid chambers 52 and 68 have a barometric pressure a certain point above atmospheric, this pressure forces the reservoir diaphragm 116 to expand away from the fluid chambers 52 and 68 and causes the slot 144 to open to vent this pressure to the chamber 118. The chamber 118 is connected to the atmosphere through the path 120 (See FIG. 2.) The slot 144 is similar to what was used in prior art.

These parts work together in the following way in the operation of the brake system.

The master cylinder assembly 10 is arranged to be activated by a vehicle operator through a brake pedal 156 and a push rod 158 which engages the rear end 160 of primary piston 24. Upon initial brake applying of piston 24, the volume of quick take-up chamber 32 decreases and fluid is pushed past cup seal 62 into chamber 34. The blow-off valve unit 88 only allows a very small flow, thus pressurization of the fluid in chamber 32 can occur in a substantially undiminished manner. Fluid is being displaced from chamber 32 at a relatively large volume but low pressure. It flows past cup seal 62, into chamber 34, through outlet 42 to break the circuit connection to that outlet. The pressure also acts on the rear end 36 of secondary piston 22 to move that piston forwardly so that its cup seal 48 closes compensation port 56 and fluid pressurization begins in chamber 38. Fluid so pressurized goes through outlet 44 to the brake circuit connected with that outlet. In a brake system where disc brakes are used on the front vehicle wheels only, the disc brake actuating circuits would be connected to outlet 42, thus taking advantage of the high volume of the fluid being delivered through that outlet to provide for quick take-up of the brake lining so that they move quickly to engage the brake disc.

The pressure in chamber 32 acts on the lower surface of the blow-off valve unit 88 while the upper side of the unit 88 is exposed to reservoir pressure, which is usually substantially atmospheric pressure. As the pressure in chamber 32 increases, it reaches a point where the main valve 154 in the blow-off valve unit 88 opens. This places in communication the quick take-up chamber 32 with reservoir chamber 68. Pressure from chamber 32 acts on a lower surface of the blow-off valve unit 88 thereby permitting a reduction in pressure in the quick take-up valve chamber 32 without permitting closure of the main valve 154 in the blow-off valve unit 88. By proportioning the area of the valve exposed to the quick take-up pressure when the valve is closed relative to the total valve lower surface area, quick take-up pressure is permitted to drop substantially, for example, to approximately one-half its blow-off pressure value, thereby substantially reducing the amount of brake pedal effort required to displace fluid from chamber 32 as the master cylinder actuation causes pressure to be generated in chambers 34 and 38 at a higher rate relative to the amount of stroke since the brake circuits no longer require any appreciable additional fluid volume. The pressurization then depends primarily on brake pedal forces exerted without requiring much brake pedal travel. Upon brake release, pistons 22 and 24 move rightwardly as seen in FIG. 1. Any required compensating fluid for chamber 38 will flow through port 54 from reservoir chamber 52 to chamber 50 past cup seal 48. At the same time, fluid is flowing from the brake circuit through outlet 44 into chamber 38. Fluid required for compensation of pressurizing chamber 34 will flow from reservoir chamber 68 through blow-off valve unit 88 to compensation port 98. The fluid will then flow past cup seal 62 into chamber 34. Compensation fluid from the reservoir 68 will also flow through compensation port 100 to quick take-up chamber 32. This chamber requires relatively large amounts of compensating fluid since the volume of chamber 32 increases rapidly upon brake release. The passages in chambers provided are sufficient for this purpose.

As the master cylinder reaches its fully released position, secondary piston cup seal 48 will open compensation port 56 so that pressurizing chamber 38 is directly connected through that port to reservoir chamber 52. Cup seal 62 will open compensation port 98 so that pressurizing chamber 34 is directly connected to the lower surface of blow-off valve unit 88.

Any temperature changes requiring fluid compensation after the brake has been released are readily permitted since both pressurizing chambers 34 and 38 have opened lines of fluid communication with the reservoir chambers of the reservoir body through blow-off valve unit 88.

If fluid transfer in the master cylinder assembly 10 causes the master cylinder fluid reservoirs 52 and 68 to need compensating air, the splash containment and seal portion 122 open at predetermined limit to permit air entry to reservoirs 52 and 68 from the chamber 118, which is connected to the atmosphere by way of the path 120. The air entry facilitates the further transfer of fluid if still required by the system or allowed through a leak. This further transfer of fluid will expedite the actuation of said fluid level sensing device 110, whereby to provide a prompt indication of excess fluid transfer from said reservoir so that corrective action may be initiated.

Figure 3:
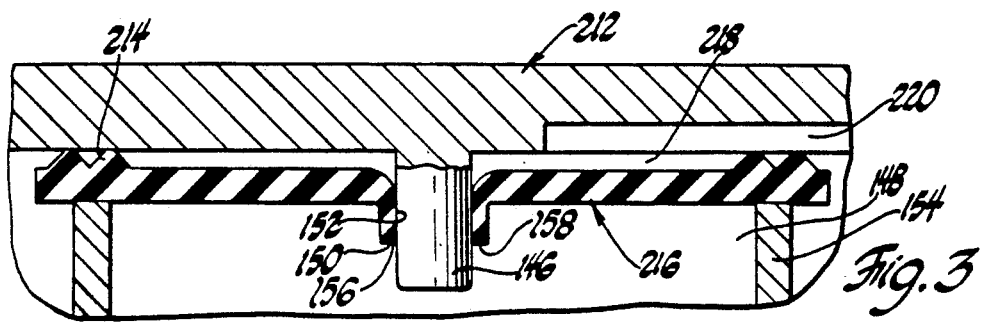
FIG. 3 is a fragmentary view in section of reservoir cap having another embodiment of this present invention.

Another embodiment of this invention is shown in FIG. 3. This embodiment is similar to FIG. 1 in that the reservoir diaphragm 216 has a sealed edge 214 which is used for connecting the diaphragm 216 to the reservoir cover 212. The reservoir cover 212 and reservoir diaphragm 216 in combination form a chamber 218. The chamber 218 vents to atmosphere through path 220.

The cover 212 has a projection 146 which protrudes towards the fluid chamber 148. The diaphragm 216 has a slit 150 having a pair of edges 156 and 158 which engage each other. The slit 150 can be similar to the prior art slot 144 shown in FIG. 2. The projection 146 passes through this slit 150. The diaphragm 216 has a sealing surface 152, adjacent to the edges 156 and 158 of the slot 150, which is normally in contact with the projection 146. When a vacuum is developed in fluid chamber 148, the vacuum exerts a force on the diaphragm 216 causing the slot 150 and sealing surface 152 to break the adherence contact with the projection 146, thereby allowing air to enter the fluid chamber 148 from the atmosphere through the path 220 in chamber 218.

The projection 146 is shown here as being a cylinder, however other shapes may be used including a cone. The slit 150 will not open when the fluid chamber 148 has a positive pressure. Positive pressure compensation is handled by the prior art of a slot (not shown) in the cover 212 on the edge that is parallel to and attaches to the reservoir body 154. This slot (not shown) is the continuation of path or groove 220 in top of the cover. The pressure forces diaphragm 216 towards cover 212 and the seal between reservoir body 154 and the diaphragm 216 is broken below groove 220. This pressure in chamber 148 is vented through this break in the seal between diaphragm 216 and reservoir body 154 and through the slot (not shown) to atmosphere.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A reservoir diaphragm cover assembly for a vehicle brake master cylinder fluid reservoir being used in atmosphere comprising:
    a reservoir diaphragm having a sealing edge for mating with and separating the cylinder fluid reservoir from a reservoir cap;
    said reservoir cap and said diaphragm forming a chamber;
    said reservoir cap having a venting means for connecting said chamber to said atmosphere, and a projection perpendicular from said prominent plane of said reservoir cap having a first sealing surface;
    a receptacle means projecting from said reservoir diaphragm towards said reservoir cap, having an interior wall for aligning the projection, where the interior wall has a second sealing surface;
    said diaphragm having a hole adjacent to said interior wall of said receptacle means, a fluid access means projecting away from said reservoir cap into said fluid reservoir; and
    said fluid access means and said interior wall of said receptacle means defining a passage between said reservoir and said chamber, whereby said passage is normally sealed with said first and second sealing surface in contact closing of said passage between said fluid reservoir and said chamber, wherein a vacuum in said fluid reservoir will pull said reservoir diaphragm and said receptacle means away from said reservoir cap and create an opening around said projection, allowing air from said atmosphere to enter said fluid reservoir eliminating said vacuum.

2. The reservoir diaphragm cover assembly of claim 1, wherein:

a fluid-level sensor device is mounted in the fluid reservoir for operating in conjunction with the passage that is normally sealed with the first and second sealing surface in contact closing of the passage between the fluid reservoir and the chamber, whereby the vacuum in the fluid reservoir will pull the reservoir diaphragm and the receptacle means away from the reservoir cap and create the opening around the projection, allowing air from the atmosphere to enter the fluid reservoir eliminating the vacuum and the air entry facilitating the further transfer of fluid from the reservoir to expedite the actuation of the fluid level sensor, to provide a prompt indication of fluid transfer from the reservoir, so that corrective action may be indicated.

3. A reservoir diaphragm cover assembly for a vehicle brake master cylinder being used in atmosphere comprising:

a reservoir diaphragm having a sealing edge for mating with and separating the cylinder fluid reservoir from a reservoir cap;

the reservoir diaphragm having a slit with a pair of edges that engage each other;

the reservoir cap having a projection perpendicular to the plane of the reservoir cap, wherein the projection projects through the slit in the diaphragm separating the edges; and the projection and the diaphragm in proximity to slit forming a seal therebetween selectively to prevent fluid passage between the fluid reservoir and the atmosphere whereby a vacuum in the fluid reservoir will pull the reservoir diaphragm away from the reservoir cap and create an opening around the projection, allowing air from the atmosphere to enter the fluid reservoir eliminating the vacuum while the projection continues to separate the edges of the slit.

* * * * *